(12) United States Patent
Aitken

(10) Patent No.: US 10,280,731 B2
(45) Date of Patent: May 7, 2019

(54) ENERGY INDUSTRY OPERATION CHARACTERIZATION AND/OR OPTIMIZATION

(71) Applicant: William A. H. Aitken, Calgary (CA)

(72) Inventor: William A. H. Aitken, Calgary (CA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 406 days.

(21) Appl. No.: 14/559,690

(22) Filed: Dec. 3, 2014

(65) Prior Publication Data

US 2016/0160627 A1 Jun. 9, 2016

(51) Int. Cl.
*E21B 44/00* (2006.01)
*G05B 13/04* (2006.01)

(52) U.S. Cl.
CPC .......... *E21B 44/005* (2013.01); *G05B 13/048* (2013.01)

(58) Field of Classification Search
CPC ............................ G05B 13/048; E21B 44/005
See application file for complete search history.

(56) References Cited

U.S. PATENT DOCUMENTS

| | | |
|---|---|---|
| 4,304,300 A | 12/1981 | Watson |
| 6,131,673 A | 10/2000 | Goldman et al. |
| 6,607,607 B2 | 8/2003 | Walker et al. |
| 6,923,871 B2 | 8/2005 | Walker et al. |
| 6,982,008 B2 | 1/2006 | Walker et al. |
| 7,860,696 B2 | 12/2010 | Chen |

(Continued)

FOREIGN PATENT DOCUMENTS

| | | |
|---|---|---|
| CA | 2235134 A1 | 5/1997 |
| RU | 2515109 C2 | 4/2012 |

(Continued)

OTHER PUBLICATIONS

Notification of Transmittal of the International Search Report and the Written Opinion of the International Searching Authority, or the Declaration; PCTUS2015/058901; dated Jan. 28, 2016;11 pages.

(Continued)

*Primary Examiner* — Mohammad Ali
*Assistant Examiner* — Vincent W Chang
(74) *Attorney, Agent, or Firm* — Cantor Colburn LLP

(57) ABSTRACT

An embodiment of a method of performing an energy industry operation includes: deploying a carrier in an earth formation, the carrier including a downhole component configured to perform the operation; performing the operation according to operational parameters; measuring a condition, the condition including at least one of a surface condition and a downhole condition, and generating measurement data representing the measured condition; tuning a simulation model of the operation based on the measurement data, the model being a mathematical model configured to estimate the condition based on the selected operational parameters; selecting a hypothetical adjustment to one or more selected operational parameters; applying the hypothetical adjustment to the simulation model to generate predicted conditions of the operation; and based on the predicted conditions representing an improvement to the operation, adjusting operational parameters according to the hypothetical adjustment.

22 Claims, 8 Drawing Sheets

(56) References Cited

U.S. PATENT DOCUMENTS

| | | | |
|---|---|---|---|
| 8,036,829 B2 | 10/2011 | Gibbs et al. | |
| 8,800,650 B2 | 8/2014 | Spray et al. | |
| 9,249,654 B2 | 2/2016 | Strachan et al. | |
| 9,528,974 B2 | 12/2016 | Livescu et al. | |
| 9,696,198 B2 | 7/2017 | Turner et al. | |
| 2005/0230116 A1 | 10/2005 | Eoff et al. | |
| 2009/0152005 A1* | 6/2009 | Chapman | E21B 7/00 175/24 |
| 2010/0033344 A1* | 2/2010 | Rozenblit | H01Q 1/04 340/853.1 |
| 2011/0077922 A1 | 3/2011 | Moncorge et al. | |
| 2011/0094746 A1 | 4/2011 | Allison et al. | |
| 2011/0153296 A1 | 6/2011 | Sadlier et al. | |
| 2013/0127900 A1* | 5/2013 | Pena | G09G 5/003 345/619 |
| 2013/0132050 A1 | 5/2013 | Parry et al. | |
| 2014/0238670 A1* | 8/2014 | Pop | E21B 7/04 166/264 |
| 2016/0314420 A1 | 10/2016 | Livescu et al. | |

FOREIGN PATENT DOCUMENTS

| | | |
|---|---|---|
| WO | 2009111324 A1 | 9/2009 |
| WO | 2010039342 A1 | 8/2010 |

OTHER PUBLICATIONS

Castro, et al., "Overcoming Extended-Reach Challenges for Annular Fracturing", SPE-1736383-MS, SPE/ICoTA Coiled Tubing & Well Intervention Conference, The Woodlands, TX, USA; Mar. 24-25, 2015, pp. 1-19.

Gravadal, et al., "Tuning of Computer Model Parameters in Managed-Pressure Drilling Applications Using an Unscented-Kalman-Filter Technique", SPE 97028, SPE Annual Tehcnical Conference & Exhibition, Dallas, Oct. 9-12, 2005, 11 pages.

Livescu, et al., "Challenging the Industry's Understanding of the Mechanical Friction Reduction for Coiled Tubing Operations", SPE-170636, SPE Annual Technical Conference and Exhibition held in Amsterdam, The Netherlands; Oct. 27-29, 2014; pp. 1-17.

Livescu, et al., "Increasing Lubricity of Downhole Fluids for Coiled-Tubing Operations", SOE168298, SPE/ICoTA Coiled Tubing and Well INtervnetion Conference, The Woodlands, TX, USA; Mar. 25-26, 2014; pp. 1-9.

Livescu, et al.; "Analytical Downhole Temperature Model for Tuning Operations"; SPE168299; 2014; Society of Petroleum Engineers; 17 pages.

Livescu, et al.; "Water Hammer Modeling in Extended Reach Wells"; SPE168297; 2014; Society of Petroleum Engineers; 14 pages.

Livescu et al., "10 Years of continuous Technology Development and Field Application of a Coiled Tubing Telemetry System: Past, Present and Future," society of Petroleium Engineers, SPE-187374-MS, 2017, 19 pgs.

Livescu et al., "Increasing Lubricity of Downhole Fluids for Coiled-Tubing Operations," 2014 SPE Journal, 9 pgs.

W.A.H. Aitken et al., "30 Years of Continuous Coiled Tubing Modeling Software Development and Field Applications Creating New Capabilities," SPE-189935-MS, Society of Petroleum Engineers, 2018, 18 pgs.

* cited by examiner

| Help | Control Traffic Lights | Traffic Lights Log | Traffic Light Detail: | ☒ |

○ Well      Downhole Restriction
○ Surface   Pump Pressure High
● Surface   GN Pressure High Pump pressure very high, pump wear is significant

FIG.6

| Help | Control Traffic Lights | Traffic Lights Log | | ✕ |
|---|---|---|---|---|

Traffic Light Control: Ignore if input is faulty

| Light | Position | Message | Active | Ignored |
|---|---|---|---|---|
| ○ | Surface | Pump Pressure High | ☑ | ☐ |
| ● | Surface | GN Pressure High | ☑ | ☐ |

FIG.7

| Help | Control Traffic Lights | Traffic Lights Log | | | | |
|---|---|---|---|---|---|---|
| Time | | Light | Message | Ack | Status Ignored | Reset |
| On | Off | | | | | |
| 17:14:40 | 17:15:04 | ○ | Change in Completion | ☒ | ☐ | ☐ |
| 17:14:42 | | ○ | Pump Pressure High | ☒ | ☐ | ☐ |
| 17:15:04 | 17:15:10 | ● | Weight Gauge Pull Limit | ☐ | ☐ | ☐ |
| 17:15:10 | 17:15:20 | ○ | Change in Completion | ☒ | ☐ | ☐ |
| 17:15:19 | 17:15:33 | ○ | GN Pressure High | ☐ | ☐ | ☐ |
| 17:15:20 | 17:15:33 | ○ | Downhole Restriction | ☐ | ☐ | ☐ |
| 17:15:33 | 17:15:45 | ● | Weight Gauge Pull Limit | ☒ | ☐ | ☐ |
| 17:15:45 | 17:15:54 | ○ | Change in Completion | ☐ | ☐ | ☐ |
| 17:15:54 | 17:15:56 | ○ | GN Pressure High | ☒ | ☐ | ☐ |
| 17:18:56 | | ● | GN Pressure High | ☒ | ☒ | ☐ |
| 17:20:38 | 17:20:49 | ○ | Change in Completion | ☐ | ☐ | ☐ |
| 17:20:49 | 17:20:58 | ○ | Downhole Restriction | ☒ | ☐ | ☐ |
| 17:20:58 | | ○ | Change in Completion | | | |

FIG.8

ENERGY INDUSTRY OPERATION CHARACTERIZATION AND/OR OPTIMIZATION

BACKGROUND

Hydrocarbon exploration and energy industries employ various systems and operations to accomplish activities including drilling, formation evaluation, stimulation and production. Measurements such as temperature and flow measurements are typically performed to monitor and assess such operations.

SUMMARY

An embodiment of a method of performing an energy industry operation includes: deploying a carrier in an earth formation, the carrier including a downhole component configured to perform the operation; performing the operation according to operational parameters; measuring a condition, the condition including at least one of a surface condition and a downhole condition, and generating measurement data representing the measured condition; tuning a simulation model of the operation based on the measurement data, the model being a mathematical model configured to estimate the condition based on the selected operational parameters; selecting a hypothetical adjustment to one or more selected operational parameters; applying the hypothetical adjustment to the simulation model to generate predicted conditions of the operation; and based on the predicted conditions representing an improvement to the operation, adjusting operational parameters according to the hypothetical adjustment.

An embodiment of a system for performing an energy industry operation includes: a carrier configured to be disposed in an earth formation, the carrier including a downhole component configured to perform the operation based on selected operational parameters; at least one sensing device configured to measure a condition during the operation, the condition including at least one of a surface condition and a downhole condition; and a processor configured to receive measurement data representing the measured condition, and apply the measurement data to a simulation model of the operation, the simulation model being a mathematical model configured to estimate the condition based on selected operational parameters. The processor is configured to perform: tuning the simulation model of the operation based on the measurement data; selecting a hypothetical adjustment to one or more selected operational parameters; applying the hypothetical adjustment to the simulation model to generate predicted conditions of the operation; and based on the predicted conditions representing an improvement to the operation, adjusting operational parameters according to the hypothetical adjustment.

BRIEF DESCRIPTION OF THE DRAWINGS

The following descriptions should not be considered limiting in any way. With reference to the accompanying drawings, like elements are numbered alike:

FIG. 6 depicts an example of the status indicator shown in FIG. 4;

FIG. 7 depicts an example of the status indicator shown in FIG. 4; and

FIG. 8 depicts an example of a status indicator log.

DETAILED DESCRIPTION

The systems and methods described herein provide for creating, updating and/or optimizing a model of an energy industry operation, and using the model to control, improve and/or optimize the operation. In one embodiment, an operation model describing a proposed operation is generated, which provides a prediction of various downhole and/or surface conditions. The conditions may include operational parameters, downhole measurements of conditions (e.g., pressure, temperature, vibration and others) and surface measurements of conditions (e.g., pump pressure, injection fluid flow rate, produced fluid properties, deployment or tripping speed, and others).

During an operation, various measurements are performed, which can be taken at the surface and/or downhole. In one embodiment, these measurements are received and applied to the model in real time. A processing device such as a surface or downhole controller automatically tunes or updates the model in real time to match measured downhole and/or surface conditions. In one embodiment, the system is configured to perform improvement and/or optimization methods by selecting or proposing hypothetical adjustments to the operation ("what if . . . ?").

The hypothetical adjustments are applied to the model to predict the response of the downhole components, the borehole and/or the formation. If one or more hypothetical adjustments are determined to be beneficial, they may be applied to the operation. These predictions are generated faster than real time, i.e., predictions based on the model in its current form may be performed prior to the next real time adjustment.

In one embodiment, the system provides a display that includes visual indicators or opportunity flags. The indicators are presented to a user based on a comparison between actual conditions (measured downhole and/or at the surface) and predicted conditions. Generation of indicators may be performed in conjunction with real time tuning of the model. For example, a method includes receiving measurement data, comparing the measured conditions to conditions predicted by the model, generating indicators based on the comparison, and tuning the model based on the comparison.

The descriptions provided herein are applicable to various oil and gas or energy industry data activities or operations. Although embodiments herein are described in the context of drilling, completion and stimulation operations, they are not so limited. The embodiments may be applied to any energy industry operation. Examples of energy industry operations include surface or subsurface measurement and modeling, reservoir characterization and modeling, formation evaluation (e.g., pore pressure, lithology, fracture identification, etc.), stimulation (e.g., hydraulic fracturing, acid stimulation), coiled tubing operations, drilling, completion and production.

Figure 1:
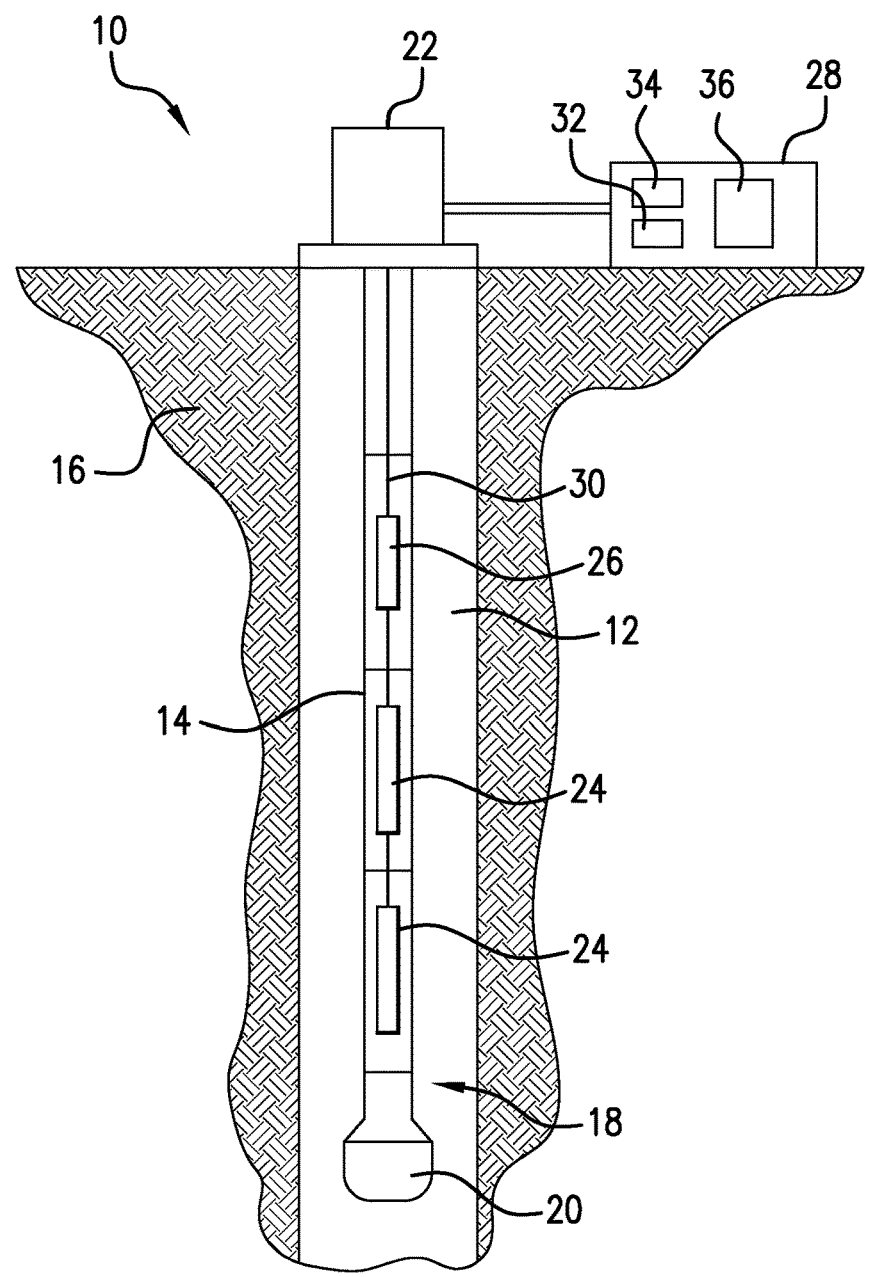
FIG. 1 depicts and embodiment of a drilling and/or geosteering system.

Referring to FIG. 1, an exemplary embodiment of a downhole drilling system 10 disposed in a borehole 12 is shown. A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. The drilling assembly 18, which may be configured as a bottom-hole assembly (BHA), includes a drill bit 20 and is configured to be conveyed into the borehole 12 from a drilling rig 22. Various measurement tools may also be incorporated into the system 10 to affect measurement regimes such as wireline measurement applications or logging-while-drilling (LWD) applications. For example, one or more downhole components, such as the drill string 14 and the drilling assembly 18, include sensor devices 24 configured to measure various parameters of the formation and/or borehole.

In one embodiment, the drilling assembly 18 and sensor devices 24 are configured to communicate with one or more processors, such as a downhole electronics unit 26 and/or a surface processing unit 28. The processor(s) may receive data and communication signals from the downhole components and/or transmit control signals to the components. Signals and data may be transmitted via any suitable transmission device or system, such as a cable 30. Other techniques used to transmit signals and data include wired pipe, electric and/or fiber optic connections, mud pulse, electromagnetic and acoustic telemetry.

Figure 2:
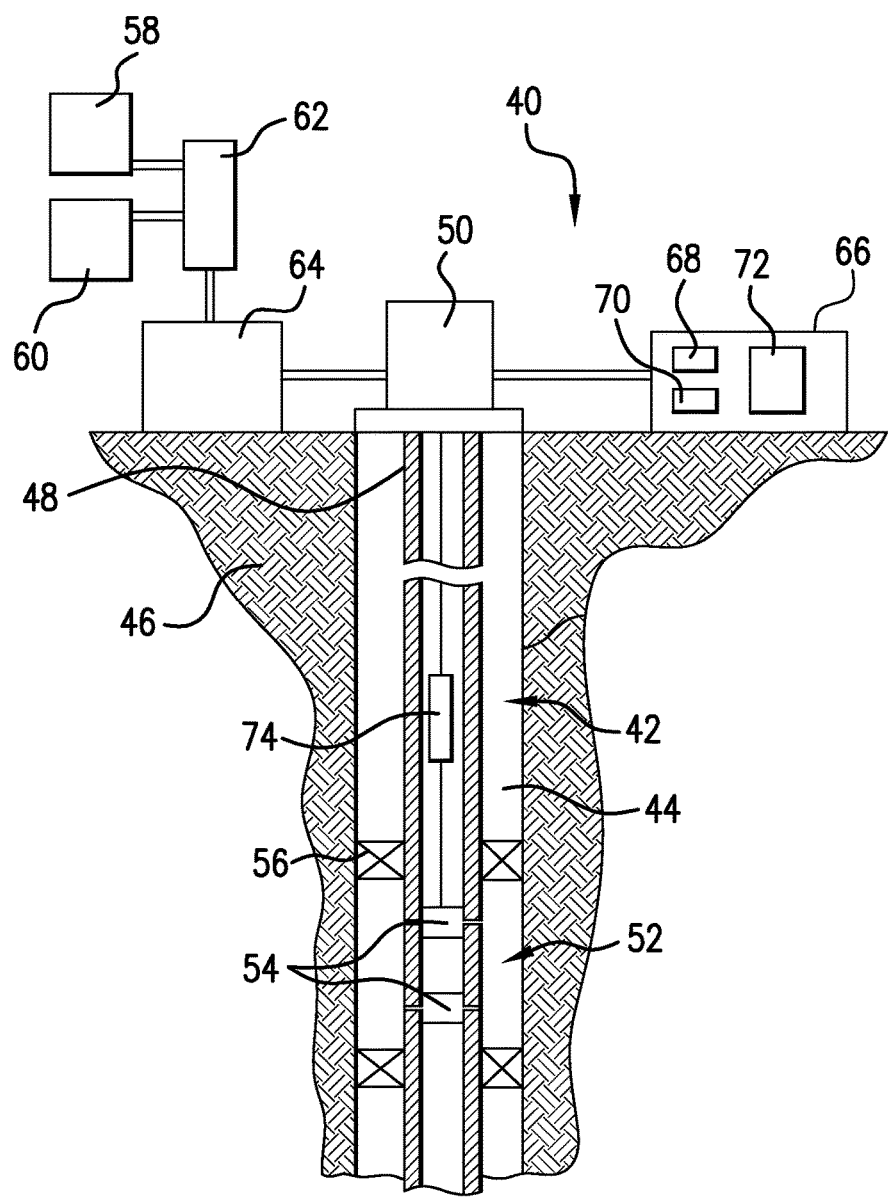
FIG. 2 depicts an embodiment of a hydrocarbon production and/or stimulation system.

Referring to FIG. 2, an exemplary embodiment of a hydrocarbon production and/or stimulation system 40 includes a borehole string 42 configured to be disposed in a borehole 44 that penetrates at least one earth formation 46. The borehole may be an open hole, a cased hole or a partially cased hole. In one embodiment, the borehole string 42 is a production string that includes a tubular 48, such as a pipe (e.g., multiple pipe segments) wired pipe or coiled tubing, that extends from a wellhead 50 at a surface location (e.g., at a drill site or offshore stimulation vessel).

The system 40 includes one or more stimulation assemblies 52 configured to control injection of stimulation fluid and direct stimulation fluid into one or more production zones in the formation. Each stimulation assembly 52 includes one or more injection or flow control devices 54 configured to direct stimulation fluid from a conduit in the tubular 48 to the borehole 44. As used herein, the term "fluid" or "fluids" includes liquids, gases, hydrocarbons, multi-phase fluids, mixtures of two of more fluids, water and fluids injected from the surface, such as water or stimulation fluids. For example, the fluid may be a slurry that includes fracturing or stimulation fluids and/or proppants. In another example, the fluid is a stimulation fluid such as an acid stimulation fluid.

Other components that may be incorporated include perforations in the casing and/or borehole, and packers 56, which are typically conveyed downhole and activated to expand when it reaches a selected depth to seal the borehole and create isolated regions. Multiple openings and packers can be disposed at multiple depth to create a plurality of isolated regions or zones.

Various surface devices and systems can be included at surface locations. For example, a fluid storage unit 58, a proppant storage unit 60, a mixing unit 62, and a pump or injection unit 64 are connected to the wellhead 50 for providing fluid to the borehole string 42 or a string/completion annulus for operations such as a fracking operation, a stimulation operation, a cleanout operation and others.

The system 40 also includes a surface processing unit such as a control unit 66, which typically includes a processor 68, one or more computer programs 70 for executing instructions, and a storage device 72. The control unit 66 receives signals from downhole sensors and surface devices such as the mixing unit 62 and the pump unit 64, and controls the surface devices to obtain a selected parameter of the fluid at a downhole location. Functions such as sensing and control functions may not be exclusively performed by the surface controller 66. For example, a downhole electronics unit 74 is connected to downhole sensors and devices and performs functions such as controlling downhole devices, receiving sensor data and communication, and communicating with the controller 66.

Figure 3:
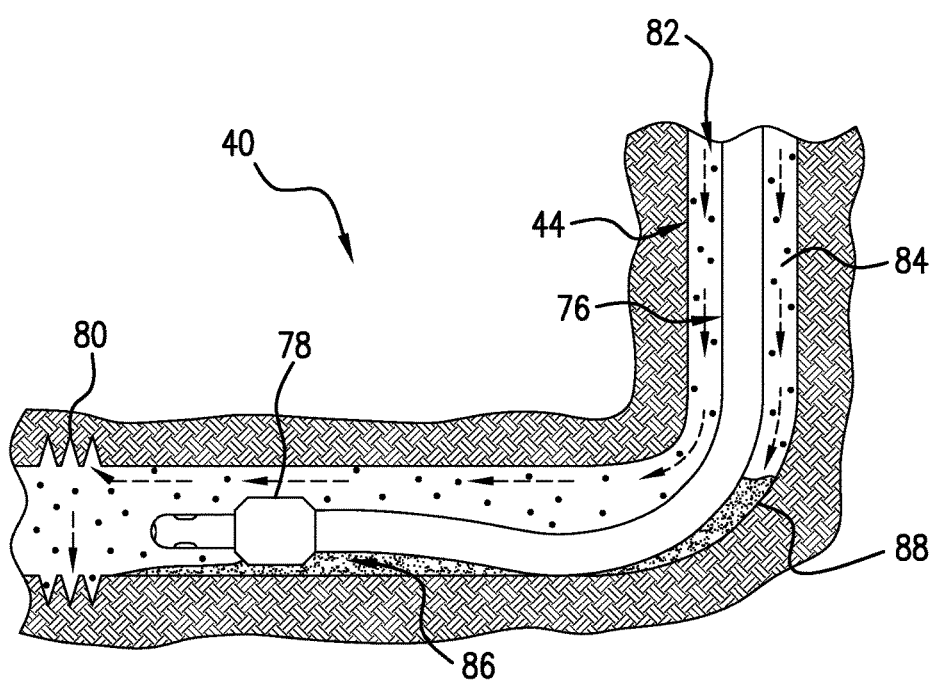
FIG. 3 depicts an embodiment of a coiled tubing system.

Another example of the system 40 is shown in FIG. 3. In this example, the borehole string 42 includes a coiled tubing 76 that can be extended into the borehole 44, e.g., a horizontal portion of the borehole 44. The term "horizontal wellbore" refers to horizontal or highly deviated wells as understood in the art. A BHA 78 is connected to the end of the coiled tubing 76 via a connector such as, for example, a "grapple" connector. Although the BHA 78 may take a variety of forms, the BHA 78 in this example includes a sand jet perforating tool equipped for reverse circulation. The sand jetting tool of the BHA 78 can be utilized to create perforations 80. In an exemplary fracturing operation, a fracturing slurry 82 is pumped down annulus 84, during which a first proppant bed 86 may begin to form on the low side of the horizontal portion, and a second proppant bed 88 may begin to form if sand perforating methods are utilized.

A variety of techniques may be used to isolate the perforations 80, such as packers or plugs. For example, a small volume of fluid with elevated sand concentrations is added to the final stage of the fracturing slurry to create a sand plug. Clean displacement fluid is then pumped behind the slurry in order to displace the fracturing slurry into the perforations.

In one embodiment, in order to avoid premature screen out issues during fracturing, residual solids or debris (e.g., proppant beds 86 and 88) are removed, i.e., cleaned out. An exemplary clean out process includes pumping a clean up fluid down the annulus 84 while the BHA 78 is downhole and/or is being moved upward, thereby circulating residual solids and proppant beds downhole toward the sand plug. The cleanout fluid is forced to flow through the BHA 78, up along the coiled tubing 76 and back to the surface. After the proppant beds and/or other debris has been removed, only cleanout fluid is present in the annulus 84. As such, the next interval can be fractured without the danger of premature screen out. It is noted that the fracturing and clean out operations are merely exemplary, as other techniques and/or components may be used for fracturing and clean out.

Various sensing or measurement devices may be included in the system 10 and/or the system 40, in downhole and/or surface locations. For example, one or more parameter sensors (or sensor assemblies such as LWD subs) are configured for formation evaluation measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), sensors for measuring borehole fluid parameters (e.g., viscosity, density, clarity, rheology, pH level, and gas, oil and water contents) and sensors for borehole state (e.g. pressure, temperature, fluid rates).

The systems described herein are equipped with a processor or processors (e.g., processing units 28 and/or 66) that are configured to receive downhole and/or surface data, and generate, adjust and/or update a simulation model that can be used to monitor and/or control operations. The simulation model may be used in real time during the operation, for example, by tuning the model based on real time measurements. The model may also be used subsequent to the operation, for example, by tuning the model based on measurements taken during the operation to enhance future operations.

In one embodiment, the model is a mathematical model that simulates aspects of an energy industry operation. Such models include, for example, an operation model that simulates various operational parameters and conditions (surface and/or downhole) as a function of time and/or depth. The model receives information describing the downhole environment (e.g., formation properties, formation fluid properties, borehole parameters such as diameter and trajectory, etc.) and operational parameters such as fluid properties, injection pressure, temperature and/or flow rate, rotational rate and others. Based on this information and the operational parameters, the model predicts the values of various conditions over the course of the operation. Such conditions include, for example, borehole pressure, borehole temperature, downhole fluid properties, production fluid properties, and others. In one embodiment, an initial operation model is generated prior to the operation based on environment information and operational parameters of a proposed operation. The initial model may be repeatedly adjusted during the operation as measurements of the various conditions are performed.

In one embodiment, the processor is configured to generate predictive information regarding potential adjustments to the operation and their effect thereon. This predictive information can be used to optimize and/or improve the operation in a manner that is faster than real time, i.e., the predictive information is generated independent of or prior to real time adjustments based on measured conditions. This is useful in that there is often a delay that occurs in taking measurements and receiving measurement data, as well as a delay that occurs between the point in time that control devices adjust operational parameters and the point in time when conditions downhole change in response to such adjustments. The predictive information allows users to evaluate adjustments to the operation without having to actually perform the adjustments and wait for conditions downhole to change.

In one embodiment, a processor utilizes a quantitative (mathematical and/or numerical) method that models conditions and parameters during an operation. For example, for a drilling or coiled tubing operation, the processor models conditions and parameters such as temperature and pressure downhole, fluid flow rate, rate of penetration, RPM, and others as a function of time.

Although the processors described herein are shown in communication with downhole components, they are not so limited. For example, a processor can be embodied as an independent computer or other processing device that can receive input data such as model parameters, measurement information and proposed tripping schedules.

The sensor devices, electronics, tools and other downhole components may be included in or embodied as a BHA, drill string component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

Figure 4:
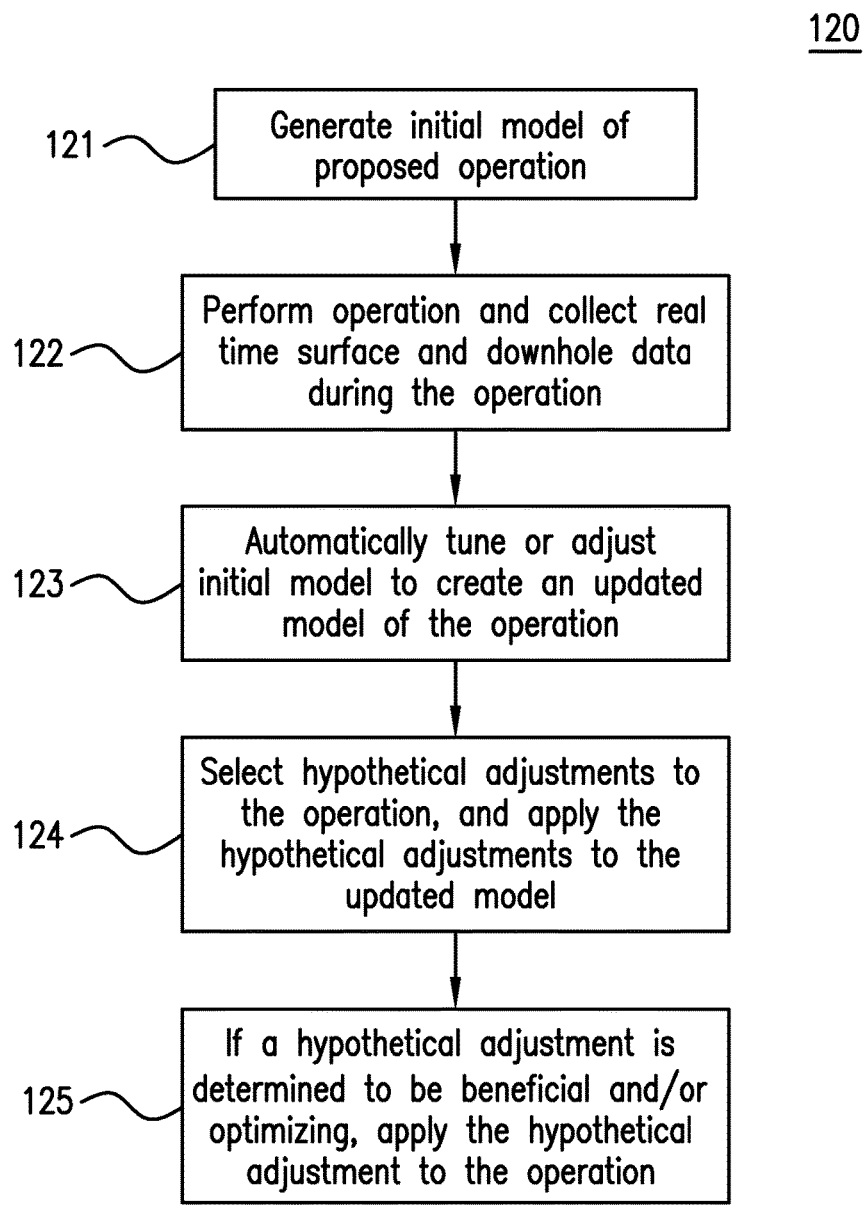
FIG. 4 is a flow chart providing an exemplary method of generating and updating a model of an energy industry operation, and of controlling the operation based on the model.

FIG. 4 illustrates a method 120 for performing an energy industry operation. The method allows operators to model an operation, adjust the model in real time, monitor operational parameters and conditions, and evaluate potential adjustments to the operation. The method also provides an effective way to improve and/or optimize the operation. The method 120 includes one or more of stages 121-125 described herein, at least portions of which may be performed by a processor (e.g., the surface processing unit 28). In one embodiment, the method 120 includes the execution of all of stages 121-125 in the order described. However, certain stages 121-125 may be omitted, stages may be added, or the order of the stages changed.

In one embodiment, the method is performed as specified by an algorithm that allows a processor (e.g., the surface processing unit 28) to automatically adjust or tune an operation model, provide status information and/or control aspects of the operation. The processor as described herein may be a single processor or multiple processors (e.g., a network).

In the first stage 121, a mathematical model of a proposed operation, also referred to as a simulation model, generated or created. The initial version of the simulation model (the "initial model") uses best estimates to characterize the formation, the borehole and fluids (e.g., formation fluids, produced fluids and injected fluids). The simulation model predicts the borehole and/or formation response to an operation or treatment. In one embodiment, the simulation model is a time transient model that simulates conditions as a function of time during an operation. Simulated conditions include, for example, tool depth, tripping speed or rate of penetration, downhole pressure, downhole temperature, downhole fluid properties, produced fluid properties, fluid flow rates, and operational parameters (e.g., pump pressures and flow rates, deployment speed, etc.)

For example, a coiled tubing operation is modeled by estimating parameter or property values as a function of time or depth, such as surface pressure, downhole pressure, tripping speed, tubing tension, friction and fluid properties. Other values or model parameters include borehole properties (e.g., borehole dimensions and trajectory), formation properties (e.g., lithology, formation porosity, borehole fluid properties, etc.), and fluid properties (e.g., pumping fluid, formation fluid, produced fluid).

In the second stage 122, the operation is performed, during which the operation is monitored and real time data is collected. In one embodiment, the real time data is acquired using a data acquisition system that includes surface and/or downhole acquisition devices or systems. One or more processors or controllers receive the real time data from surface and/or downhole measurement devices. Surface measurement devices include, e.g., well head pressure sensors, temperature sensors, pump pressure sensors, surface flow rate sensors, and measurement devices for estimating depth of the coiled tubing. Various downhole measurement devices may be incorporated with downhole tools, such as pressure and temperature sensors, strain sensors for measuring strain, vibration and friction (fluid and/or contact friction), flow rate sensors and others.

Based on the real time data, the processor may tune the simulation model, monitor the operation and/or provide alerts and other information to a user.

In the third stage 123, the initial simulation model is automatically tuned during the operation using the real time data. This auto-tuning can be performed based on surface data, downhole or bottomhole data, or both. In one embodiment, a tuning model is created that uses the real time date to dial in or adjust the simulation model. In one embodiment, borehole data refers to measurements taken within a borehole, e.g., at a bottom hole location, an isolated region of the borehole, a region of the borehole at which a BHA or other component is located, or any other desired region in the borehole.

For example, the tuning model is used to compare measured conditions to estimated conditions. "Measured conditions" include any condition that is measured by a surface or downhole measurement device. "Estimated conditions" include the values of the conditions simulated by the simulation model for the time or time period associated with the measured conditions. If there are significant differences between the measured conditions and the estimated conditions, the simulation model is adjusted so that the simulated conditions match the measured conditions.

In the fourth stage 124, hypothetical adjustments are selected or considered, and applied to the model to predict effects on the borehole, formation and/or operation. For example, a number of "What if?" scenarios are generated, each of which may be applied to the current version of the simulation model A hypothetical adjustment is selected that may have the potential to improve the operation. For example, for a debris clean-out operation, a hypothetical adjustment may take the form of "What if the fluid injection rate is increased?". In this example, the fluid injection rate currently specified in the simulation model is increased by one or more amounts. For each increase, conditions (e.g., downhole pressure, debris cleanout rate and production fluid rates) are predicted.

In the fifth stage 125, if any of the hypothetical adjustments are determined to be beneficial or otherwise optimize the operation, such adjustments are applied to the operation.

The auto-tuning and predictions using hypothetical adjustments described herein can be performed repeatedly, e.g., periodically according to selected times. For example, the simulation model is iteratively adjusted as measurement data is acquired. For example, the model includes a current wellbore friction (fluid and/or contact) profile according to a current iteration of the model. A set of downhole pressure data is acquired, and the model is iterated to match actual pressure values by changing fluid friction values.

An example of the method 120 is described as follows for a well clean-out operation. Operational parameters are selected, such as the type of fluid injected, pump rates, tripping speeds and others. A simulation model of the operation is constructed based on the operational parameters and other information, such as formation properties, borehole size and trajectory, debris in the borehole and others.

The simulation model estimates conditions over the course of the planned operation. Such conditions include bottomhole or borehole flow rates, temperatures, fluid/debris production rates, borehole pressures and others. The model may provide these conditions as a function of time.

During the cleanout operation, various parameters and conditions are measured, such a borehole pressure, temperature and/or flow rate. In addition, surface parameters and conditions may be measured, such as fluid production rates, injection rates, etc. If the measured parameters or conditions do not match the model, the model may be automatically adjusted during the operation.

Also during the operation, hypothetical adjustments are selected and applied to the model to predict their effect on operational parameters and conditions. For example, a "what if" scenario may be "how much time would be saved if fluid injection rates are increased?" This hypothetical adjustment, i.e., a selected increase in injection rate and/or pressure, is applied to the model. If there is sufficient time savings (without detrimentally affecting other conditions), the hypothetical adjustment may be realized. In this way, the operation can be optimized faster than real time, by anticipating reactions to future adjustments and allowing for adjustments without having to wait for real time measurements.

In one embodiment, the systems and methods described herein include or utilize indicators that indicate or warn a user or system of any discrepancies between the modeled or simulated conditions and actual conditions measured during an operation. The indicators may be visual indicators that provide a simple and easy to recognize way for an operator to recognize problems or potential problems.

Figure 5:
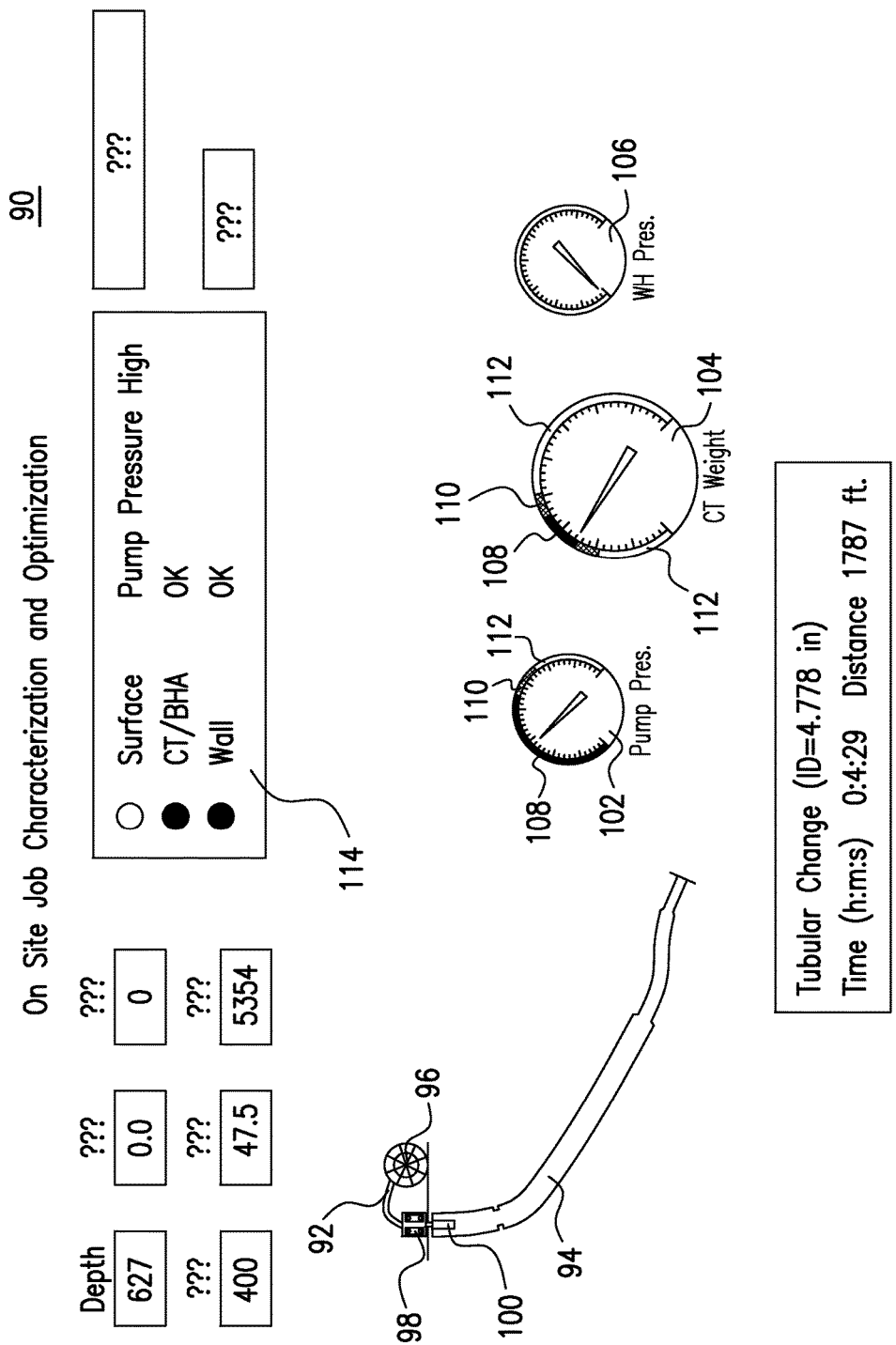
FIG. 5 depicts a portion of an exemplary display that includes a status indicator and other visual indicators representing operational parameters and conditions.

FIGS. 5-8 illustrate exemplary displays and indicators that can be used during a downhole operation. The operation in this example is a tubular (e.g., coiled tubing) deployment operation, but is not so limited, as the displays and indicators may be utilized for any of a variety of energy industry operations. Tubular deployment may be performed for various reasons, such as well cleanout (debris cleanout) or stimulation (e.g., hydraulic fracturing, acid stimulation, etc.). FIG. 5 is an exemplary display 90 that shows surface equipment and coiled tubing 92 to be deployed in a borehole 94. The surface equipment includes a reel 96 from which the coiled tubing is drawn and an injector 98. The coiled tubing 92 is coupled to one or more tools 100 to be deployed downhole. Examples of such tools include stimulation tools, hydraulic setting tools, perforating tools, fluid injection tools, cleanout tools and others.

As also shown in FIG. 5, the display includes indicators (also referred to as "opportunity flags"). In this example, the indicators are color coded to indicate a warning or problem level or severity. In the examples described herein, the severity is indicated using green, yellow and red colors, indicating a normal condition, a warning condition and a severe condition, respectively.

Visual indicators are displayed that illustrate property, operational parameter and/or condition values. In this example, representations of a pump pressure gauge 102, a coiled tubing weight gauge 104 and a wellhead pressure gauge 106 are displayed. The gauges may be labeled with a normal (green) region 108, a warning region 110 and a severe warning region 112. A status or warning indicator 114 provides a simple visual indicator, similar to a traffic light, which provides the status of each measured property or condition.

In one embodiment, the opportunity flags or indicators are configured to provide an indication of the severity of any discrepancy between a measured condition and a simulated condition (estimated or predicted using the simulation model). For example, the weight gauge 104 includes a green region 108, which indicates that the weight of the coiled tubing is within a range that is predicted by the model, or is within some error relative to the predicted weight. The yellow region 110 indicates that the weight is outside the green region, i.e., outside an acceptable difference from the modeled weight. The red region 112 indicates that the weight is even further outside the acceptable difference and should be remedied quickly or immediately.

FIG. 6 shows another example of the status indicator 114, which displays a "traffic light" for each condition of interest, and a description of the condition. As demonstrated in FIG. 7, conditions to be monitored or included in the status indicator can be selected by a user. For example, each condition shown in FIG. 6 can be selected as "active" or "ignored".

FIG. 8 shows an example of a temporal record or log of the indicators as a function of time. In this example, each yellow or red traffic light that occurred, along with its corresponding time and duration, are displayed as a "traffic light log".

As discussed above, various hypothetical adjustments or what-if scenarios can be evaluated during the operation based on the model and real time measurements. For illustration, the following is a list of exemplary hypothetical adjustments or scenarios:

What is the depth achievable if lubricant is pumped into the borehole?

How much time can be saved by increasing rates during a debris cleanout?

These hypothetical adjustments may be applied to the simulation model to provide an answer to these scenarios and allow an operator or processor to determine whether the adjustments posed by such scenarios should be actually applied to the operation.

In one embodiment, the indicators are used in conjunction with the method 120, for example, by selecting and applying hypothetical adjustments in response to a warning indicator. For example, an indicator (e.g., a yellow or red traffic light indicator) shows that the wellhead pressure is increasing due to well gas production. A potential adjustment may be displayed with or in conjunction with the indicator, for example, a proposed decrease in the $N_2$ injection rate. One or more values of the decrease are applied to the current version or iteration of the simulation model, which outputs predicted changes in wellhead pressure in response to the decrease. These predicted changes may also be displayed with the indicator and the potential adjustment. If the changes in wellhead pressure are desirable, the corresponding decrease in injection rate can be applied to the operation. In another example, if WHP is decreasing due to debris blockage, various increases in fluid injection rates can be evaluated using the simulation model. This process can be performed for any number of situations.

The systems and methods described herein provide various advantages over prior art techniques. Improvement and/or optimization of an energy industry operation can be achieved using the tuned model and methods described herein, thereby increasing field competence and capability.

Generally, some of the teachings herein are reduced to an algorithm that is stored on machine-readable media. The algorithm is implemented by a computer or processor such as the processing unit 28 or the processing unit 66, and provides operators with desired output.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features.

Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of performing an operation on an earth formation within an existing borehole penetrating the earth, comprising:

deploying coiled tubing in the existing borehole, the coiled tubing being configured to perform the operation on the earth formation within the existing borehole;

performing the operation according to operational parameters used in performing the operation;

measuring a condition at a selected time during the operation, the condition including at least one of a surface condition and a downhole condition, and generating measurement data representing the measured condition;

tuning a simulation model of the operation based on the measurement data, the model being a mathematical model configured to estimate the condition based on selected operational parameters used as input to the simulation model, wherein tuning the simulation model includes estimating the condition for the selected time at which the condition was measured based on the simulation model, wherein tuning the simulation model includes automatically tuning the simulation model by a processor in real time during the operation, in response to receiving the measurement data;

comparing the estimated condition to the measured condition, and determining a difference between the estimated condition and the measured condition;

based on the difference being greater than a selected acceptable difference, selecting a hypothetical adjustment to one or more values of one or more selected operational parameters used in performing the operation;

inputting the hypothetical adjustment to the one or more values of the one or more selected operational parameters into the simulation model to generate predicted conditions of the operation; and based on the predicted conditions representing an improvement to the operation, adjusting physical operational parameters according to the hypothetical adjustment of the one or more values of the one or more selected operational parameters.

2. The method of claim 1, wherein tuning the simulation model includes modifying the simulation model so that the estimated condition produced by the simulated model matches the measured condition.

3. The method of claim 1, further comprising generating the model based on information known prior to the operation.

4. The method of claim 1, further comprising generating at least one indicator indicating a status of the condition.

5. The method of claim 4, wherein generating the at least one indicator includes displaying a visual indicator that indicates the discrepancy between the estimated condition and the measured condition.

6. The method of claim 5, wherein the visual indicator is color coded to represent a relative severity of the discrepancy.

7. The method of claim 5, further comprising displaying a description of the hypothetical adjustment and the predicted conditions with the at least one indicator.

8. The method of claim 1, wherein measuring the condition and tuning the simulation model are performed in real time during the operation.

9. The method of claim 1, wherein tuning the simulation model includes iteratively adjusting the simulation in response to periodically receiving measurement data.

10. The method of claim 1, wherein a downhole component is disposed on the coil tubing and the downhole component is configured to perform the operation with the coiled tubing.

11. The method of claim 1, wherein the operation is a cleanout operation within the existing borehole.

12. The method of claim 1, wherein the operation is a stimulation operation within the existing borehole.

13. A system for performing an operation on an earth formation within an existing borehole penetrating the earth, comprising:
coiled tubing configured to be disposed in the existing borehole, the coiled tubing being configured to perform the operation on the earth formation within the existing borehole based on selected operational parameters;
at least one sensing device configured to measure a condition during the operation at a selected time during the operation, the condition including at least one of a surface condition and a downhole condition; and
a processor configured to receive measurement data representing the measured condition, and apply the measurement data to a simulation model of the operation, the simulation model being a mathematical model configured to estimate the condition based on selected operational parameters used as input to the simulation model, the processor configured to perform:
tuning the simulation model of the operation based on the measurement data, wherein tuning the simulation model includes estimating the condition for the selected time at which the condition was measured based on the simulation model, wherein the processor is configured to automatically tune the simulation model in real time during the operation, in response to receiving the measurement data;

comparing the estimated condition to the measured condition, and determining a difference between the estimated condition and the measured condition;
based on the difference being greater than a selected acceptable difference, selecting a hypothetical adjustment to one or more values of one or more selected operational parameters used in performing the operation;
inputting the hypothetical adjustment to the one or more values of the one or more selected operational parameters into the simulation model to generate predicted conditions of the operation; and
based on the predicted conditions representing an improvement to the operation, adjusting physical operational parameters according to the hypothetical adjustment to the one or more values of the one or more selected operational parameters.

14. The system of claim 13, wherein tuning the simulation model includes modifying the simulation model so that the estimated condition produced by the simulated model matches the measured condition.

15. The system of claim 13, wherein the simulation model is initially generated prior to the operation based on information known prior to the operation.

16. The system of claim 13, wherein the processor is configured to generate at least one indicator indicating a status of the condition.

17. The system of claim 16, wherein the processor is configured to display a visual indicator that indicates a discrepancy between the estimated condition and the measured condition.

18. The system of claim 17, wherein the visual indicator is color coded to represent a relative severity of the discrepancy.

19. The system of claim 17, further comprising displaying a description of the hypothetical adjustment and the predicted conditions with the at least one indicator.

20. The system of claim 13, wherein the processor is configured to measure the condition and tune the simulation model in real time during the operation.

21. The system of claim 13, wherein the processor is configured to iteratively adjust the simulation in response to periodically receiving measurement data.

22. A method of performing a drilling operation for drilling a borehole penetrating the earth, comprising:
deploying coiled tubing configured to perform the drilling operation for drilling the borehole; performing the drilling operation according to operational parameters;
measuring a condition at a selected time during the drilling operation, the condition including at least one of a surface condition and a downhole condition, and generating measurement data representing the measured condition;
tuning a simulation model of the drilling operation based on the measurement data, the model being a mathematical model configured to estimate the condition based on the selected operational parameters used as input to the simulation model, wherein tuning the simulation model includes estimating the condition for the selected time at which the condition was measured based on the simulation model, wherein tuning the simulation model includes automatically tuning the simulation model by a processor in real time during the operation, in response to receiving the measurement data;

comparing the estimated condition to the measured condition, and determining a difference between the estimated condition and the measured condition;

based on the difference being greater than a selected acceptable difference, adjusting the simulation model so that the estimated condition matches the measured condition;

selecting a hypothetical adjustment to one or more values of selected operational parameters used in the drilling operation based on a future changed downhole condition;

inputting the hypothetical adjustment to the one or more values of the selected operational parameters to the tuned simulation model to generate predicted conditions of the drilling operation; and based on the predicted conditions representing an improvement to the drilling operation, adjusting physical operational parameters according to the hypothetical adjustment to the one or more values of the selected operational parameters before the future changed downhole condition occurs in response to the changed downhole condition actually occurring.

* * * * *